United States Patent [19]
Kawai et al.

[11] Patent Number: 5,921,858
[45] Date of Patent: Jul. 13, 1999

[54] VENTILATOR FOR USE WITH VEHICLE SEAT

[75] Inventors: Yoshiaki Kawai, Tokyo-to; Yoshitaka Ogimura; Noritaka Kasugai, both of Aichi-ken, all of Japan

[73] Assignee: JC Associates Co., Ltd., Tokyo, Japan

[21] Appl. No.: 08/944,889

[22] Filed: Oct. 6, 1997

[30] Foreign Application Priority Data

Oct. 7, 1996 [JP] Japan .................................. 8-284678
Aug. 29, 1997 [JP] Japan .................................. 9-249468

[51] Int. Cl.⁶ ...................................................... B60H 1/24
[52] U.S. Cl. ................ 454/120; 297/180.11; 297/180.14
[58] Field of Search ......................... 297/180.11, 180.14; 454/120, 907

[56] References Cited

U.S. PATENT DOCUMENTS

| | | | |
|---|---|---|---|
| 2,158,801 | 5/1939 | Petterson | 454/120 |
| 3,370,520 | 2/1968 | Mauch | 454/120 X |
| 4,435,015 | 3/1984 | Trotman et al. | 297/453 |
| 4,712,832 | 12/1987 | Antolini et al. | 454/120 X |
| 4,923,248 | 5/1990 | Feher | 297/180 |
| 4,981,324 | 1/1991 | Law | 297/180 |
| 4,997,230 | 3/1991 | Spitalnick | 454/120 X |
| 5,004,294 | 4/1991 | Lin | 454/120 X |
| 5,370,439 | 12/1994 | Lowe et al. | 297/180.11 |

FOREIGN PATENT DOCUMENTS

| | | |
|---|---|---|
| 2 641 956 | 7/1990 | France . |
| 21 10 632 | 9/1972 | Germany . |
| 42 00 825 | 7/1993 | Germany . |
| 295 05 981 U | 6/1995 | Germany . |
| 54178609 | 6/1953 | Japan . |
| 60-142660 | 3/1984 | Japan . |
| 6134948 | 8/1984 | Japan . |
| 63106358 | 12/1986 | Japan . |
| 3-51048 | 9/1989 | Japan . |
| 95/14409 | 6/1995 | WIPO . |

OTHER PUBLICATIONS

Patent Abstracts Of Japan; vol. 13, No. 446, JP 01–172012, filed Jul. 6, 1989 (1 page).

Official action dated Mar. 23, 1998 issued by the Japanese Patent Office concerning the corresponding Japanese patent application (JP Pat. Appln. No. 284678/1996) and English translation therefor.

Primary Examiner—Harold Joyce
Attorney, Agent, or Firm—Flynn, Thiel, Boutell & Tanis, P.C.

[57] ABSTRACT

A ventilator (10) comprises an air sheet (11) including a cushion member (13) configured in conformity to a seat (9) and having a number of air passage formed therein which allows an air to flow therethrough, and a non-permeable seat-like member (14) mounted to cover substantially the entire surface of the cushion memeber (13) and having permeable sections (15A, 15B) which provide a communication between the cushion member (13) and the exterior formed at given locations (A1, A2) on the front surface, and a hose (12) connected to the air sheet (11) for introducing an air at a given temperature from an air conditioner into the cushion member (13). The air sheet (11) is detachably mounted on a seat (9).

16 Claims, 12 Drawing Sheets

VENTILATOR FOR USE WITH VEHICLE SEAT

BACKGROUND OF THE INVENTION AND RELATED ART STATEMENT

1. Field of the Invention

The invention relates to a ventilator to be mounted on and for use with vehicle seat.

2. Description of the Prior Art

Recently, automobiles equipped with air conditioners are generally popular. An air conditioner supplies a cold or warm air into a vehicle compartment through an air discharge port depending on the air temperature outside the vehicle, thus maintaining an appropriate air temperature within the compartment. A seat disposed in the compartment including a seating area and a back rest comprises a resilient cushioning member molded from urethane foam, for example, the surface of which is covered by a sheet member such as formed of synthetic leather or cloth. Since an air conditioner mounted on the vehicle is powered from an engine, it takes a length of time from the start of operation of the conditioner until a suitable temperature is reached within the compartment, depending on the capacity of the conditioner, a temperature difference between the inside and the outside of the vehicle, the dimension of the compartment, the number of occupying persons or the like. Accordingly if one gets on an automobile which is heated by solar radiation on a hot day in summer, discomfort may be experienced because of the heat accumulation to a high temperature of the seat itself which may be transferred to his body or which may cause a sweating of part of the body which comes into contact with the seat. To accommodate for this, it has been the practice in summer heretofore to place a cushion woven into a meshwork from natural material such as palm or flax on the seat to provide an air layer between the body and the seat which absorbs or releases moisture. Also known in the art is a concatenation of a multiplicity of heat absorbing spheres into a surface, which is placed on the seat. On the other hand, in winter, a warming cushion is laid on the seat to remove any discomfort that may result from bodily heat being lost by the cold seat.

However, if such weaving or matting is placed on the seat, it takes a length of time until a suitable temperature is reached since the air conditioner has started to operate. The length of time increases for greater difference between the intended temperature and the outside air temperature because there is a limit on the capacity of the air conditioner. Thus, there remains a problem that one is forced to endure in the compartment while all windows are closed until the suitable temperature is reached. It is also noted in automobiles in which an air discharge port from an air conditioner is frequently located on a front seat, a temperature difference is caused between front and rear seats, presenting a problem that the temperature may be comfortable to a passenger sitting on one of these seats while it may be unsatisfactory or excessive to another passenger sitting on the other seat. In addition, it is possible as in summer that if the compartment air is cooled by the air conditioner to maintain a suitable temperature during the running of an automobile, the bodily heat is accumulated in the seat itself to cause a discomfort. Finally, there is a problem that it is difficult to choose a suitable temperature as the number of passengers increases because the sensation to hotness or coldness varies from person to person.

OBJECT AND SUMMARY OF THE INVENTION

Accordingly, it is an object of the invention to provide a ventilator for use with vehicle seat which is capable of affording a comfortably seated condition immediately upon initiation of operation of an air conditioner in a manner independent from a temperature within a compartment and from a seat location while accommodating for differential sensation to hotness or coldness among passengers and which facilities a maintenance by a simplified construction and allows a reduction in the manufacturing cost as well as the operating cost.

The above object is accomplished in accordance with the invention by providing a ventilator comprising an air sheet mounted on a seat and including an air channel member which is internally formed with a clearance which permits an air to flow therethrough and a non-permeable member mounted to cover substantially the entire surface of the air channel member and having a permeable section formed on its front surface side which provides a communication between the air channel member and an exterior, and an air introduction passage detachably mounted on the air sheet for introducing an air at a given temperature from an air conditioner into the air channel member.

In accordance with the invention, when a user sits on a seat having the air sheet mounted thereon and an air at a given temperature is introduced into the air channel member through the introduction passage, an air channel is defined within the air channel member at part of the permeable section which is located between a contacting surface of a user and the non-permeable member, displacing externally the air which worked through the permeable section which is out of contact with the user. Accordingly, the introduced air at the given temperature flows to the permeable section which is in contact with the user, thus flowing in direct contact with the body of the user to cool or warm the latter depending on the introduced air.

The above object is also accomplished by providing a ventilator comprising an air sheet mounted on a seat and including an air channel member which is internally formed with a clearance which permits an air to flow therethrough and a non-permeable section mounted to cover substantially the entire surface of the air channel member, with a passage which provides a communication between the air channel member and an exterior formed at a given location in the non-permeable member, and an air introduction passage detachably mounted on the air sheet for introducing an air at a given temperature from an air conditioner into the air channel member.

In accordance with the invention, when a user sits on a seat having the air sheet mounted thereon and an air at a given temperature is introduced into the air channel member through the introduction passage, an air channel is defined within the air channel member which is held sandwiched by the non-permeable member, whereby the introduced air flows through the air channel member and in contact with the non-permeable member while the air which worked is externally displaced through the passage. In this manner, the introduced air can cool or warm the body of the user through the contacting surface of the non-permeable member.

DETAILED DESCRIPTION OF PREFERRED EMBODIMENTS

Figure 1:
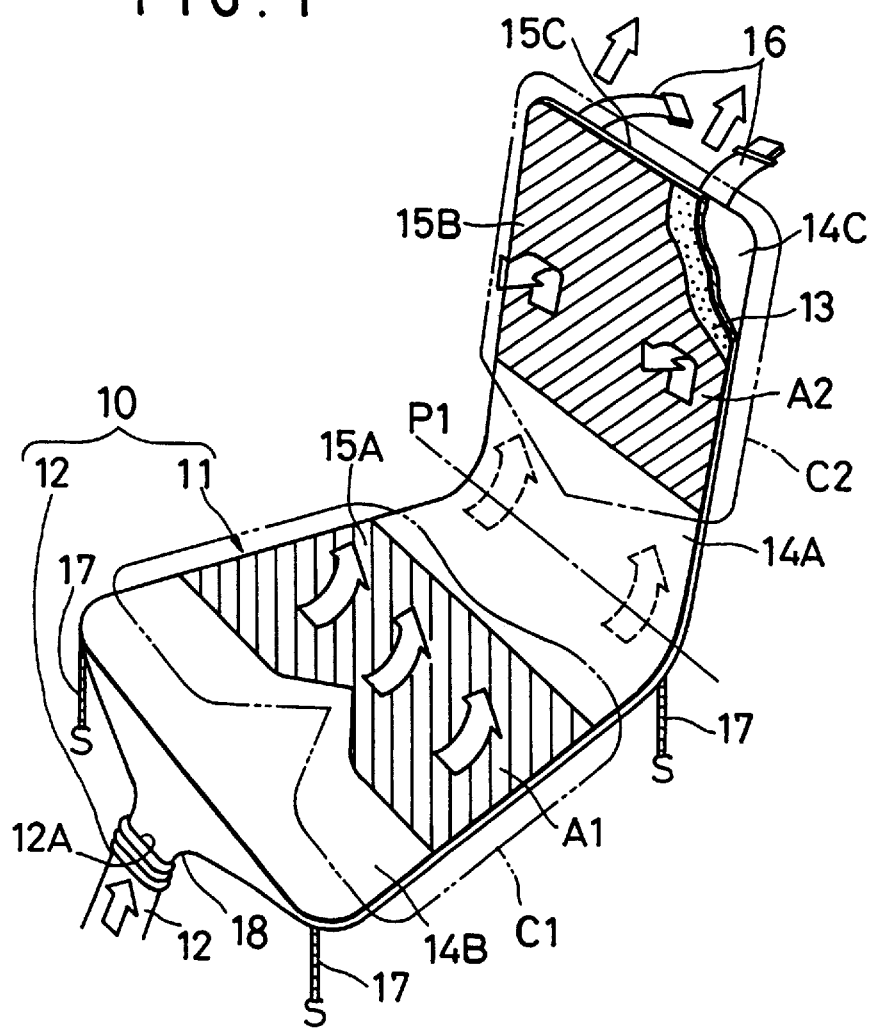
FIG. 1 is a perspective view, partly broken away, of a ventilator for use with vehicle seat according to a first embodiment of the invention.
Figure 3:
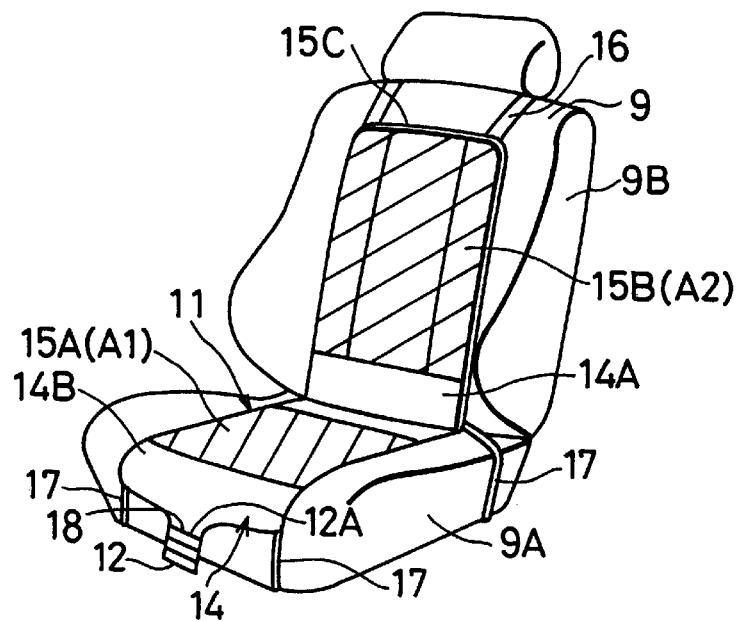
FIG. 3 is an illustration of the ventilator of FIG. 1 mounted on the seat of an automobile.

The invention will now be described in connection with several embodiments shown in the drawings. As shown in FIG. 1, a ventilator 10 for use with vehicle seat according to a first embodiment of the invention comprises an air sheet 11 including a cushion member (air channel member) 13 configured substantially in conformity to a seat 9 (see FIGS. 3 and 5) of an automobile equipped with an air conditioner (see FIG. 5), for example, the seat 9 including a seating area 9A and a back rest 9B, the member 13 having a myriad of pores therein through which an air can pass, thus providing an air permeability, and a sheet-like member (non-permeable member) 14 mounted to cover substantially the entire surface of the cushion member 13 and having a permeable section 15 on its front surface side which allows a communication between the cushion member 13 and an exterior, and a hose (introduction passage) 12 detachably connected to the air sheet 11 for introducing an air at a given temperature from the exterior into the cushion member 13. The sheet-like member 14 is formed of a non-permeable material such as vinyl chloride, leather or the like, and is attached to cover the rear surface side of the cushion member 13.

The cushion member 13 is a resilient, foldable and flexible cushion member having a given thickness, and is formed by weaving a plastic mono-filament yarn in the manner of a pile yarn on a double pile loom into a honey-comb structure. The entire rear surface of the air sheet 11 represents a non-permeable section 14C which is covered by the sheet-like member 14 while the front surface of the air sheet 11 comprises non-permeable section 14A, 14B which are covered by the sheet-like member 14 and permeable section 15A, 15B which are formed by a permeable textile fabric or a meshy cloth. The permeable section 15 is formed at given locations A1, A2 (shown hatched in FIGS. 1 and 2) on the front surface of the cushion member 13 and allows a communication between the cushion member 13 and the exterior. The permeable sections 15A, 15B are formed in areas which substantially correspond to areas C1, C2 (see FIGS. 1 and 2) which are contacted by the buttocks and the back, respectively, of a user when the latter sits on the air sheet 11 which is mounted on the seat 9. In the present embodiment, the permeable sections 15A, 15B are formed in areas slightly narrower than the contacted areas C1, C2, namely, in areas A1, A2 shown hatched in FIGS. 1 and 2.

Figure 2:
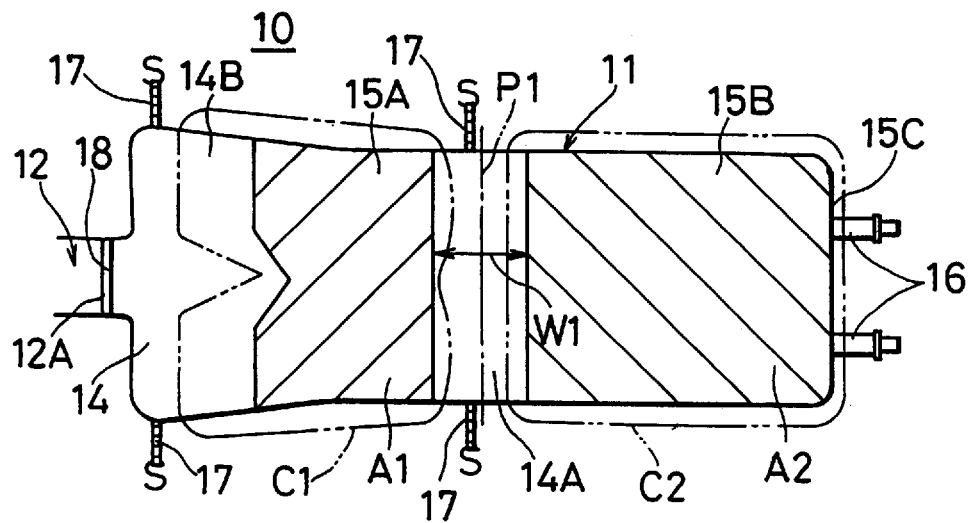
FIG. 2 is a plan view of the ventilator shown in FIG. 1.

As shown in FIGS. 1 and 2, on the front side of the air sheet 11, non-permeable sections 14A, 14B are defined by the sheet-like member 14 in given areas. It will be noted that the non-permeable section 14A is formed to extend a given length W (see FIG. 2) lengthwise along a substantially central area P1 where the air sheet 11 is folded, when it is applied to the seat 9, to extend along the seating area 9A and the back rest 9B (see FIG. 3). The sheet-like member 14 having a heat insulating capability is used for the non-permeable section 14A so that the influence of the introduced air upon the waist of the user is avoided. The other non-permeable section 14B is located forwardly of the permeable section 15A (or to the left thereof as viewed in FIG. 2). An air introduction port 18 is disposed forwardly of the non-permeable section 14B or the seating area of the air sheet 11, and is connected to an outlet end 12A of a hose 12. At this end, an air channel is formed inside the cushion member 13 by the combination of the non-permeable section 14B and the sheet-like member 14C on the rear side in a region located between the air introduction port 18 and the permeable section 15A. It will be noted that an air discharge port 15C is formed at the upper end of the permeable section 15B, located alongside the back rest, which maintains a communication with the exterior if the user sits on the air sheet 11.

Figure 5:
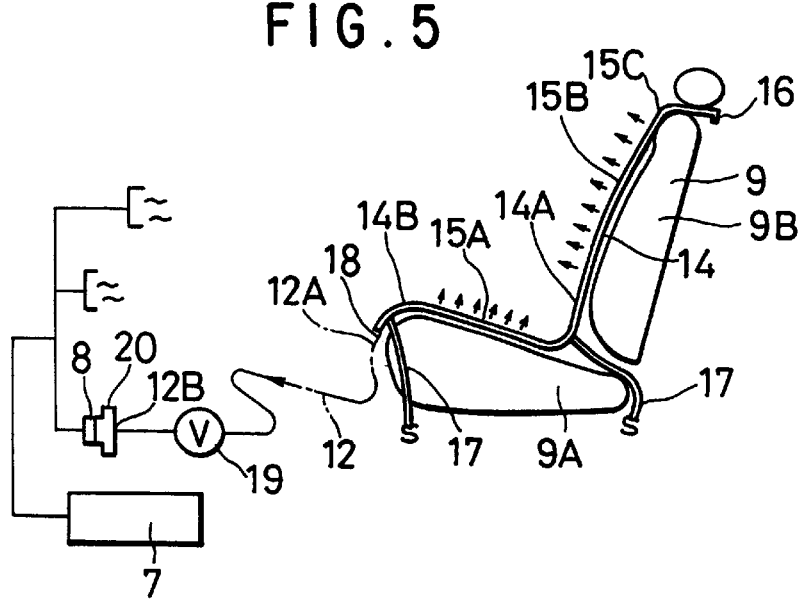
FIG. 5 is another illustration of the ventilator of FIG. 1 mounted on the seat of an automobile.
Figure 6:
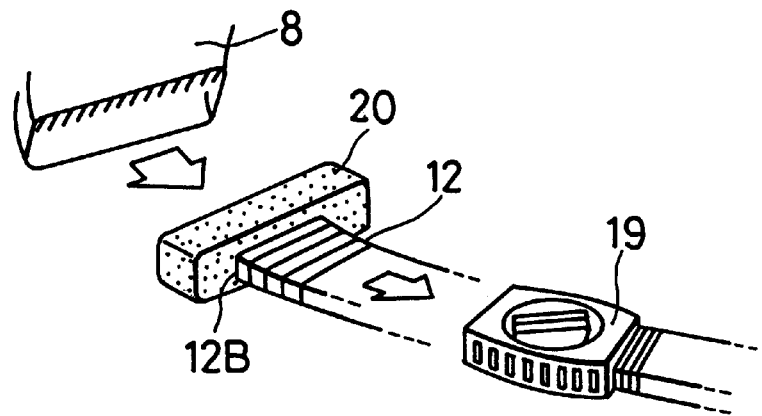
FIG. 6 is a depiction of a hose which forms part of the ventilator shown in FIG. 1.

The hose 12 is molded into the configuration of bellows from a synthetic resin material, and thus is both flexible and extensible/shrinkable. Referring to FIGS. 5 and 6, an adapter 20 is attached to the inlet end 12B of the hose 12, and is connected to an air discharge port 8 of an air conditioner 7. An air regulating valve 19, which allows an adjustable throttling of an internal air passage, is connected in the hose 2. The valve 19 also allows the air passage to be blocked and to be released to the exterior. In this manner, the flow rate of the air at the given temperature (which may be either cold or warm air) discharged from the port 8 and delivered into the air sheet 11 can be controlled. The adapter 20 may be molded from foamed styrol or may be molded from urethane to permit an elastic deformation or may comprise a joint member, and is chosen to match the configuration of the air discharge port 8. Mounting belts 16 and S-shaped fixtures 17 are used along the outer edge of the air sheet 11 to mount it to the seat 9.

The operation of the ventilator 10 will be described. Initially, the air sheet 11 is mounted on the seat 9 disposed in the compartment of an automobile equipped with the air conditioner 7, using the belts 16 and the fixtures 17. Then, the air introduction port 18 of the air sheet 11 is connected to the air discharged port 8 of the air conditioner by the hose 12. As the user sits on the seat 9 on which the air sheet 11 is mounted and the engine is started to operate the air conditioner 7, the air (either cold or warm air) at the given temperature from the air discharged port 8 is introduced into the air sheet through the hose 12.

Figure 4:
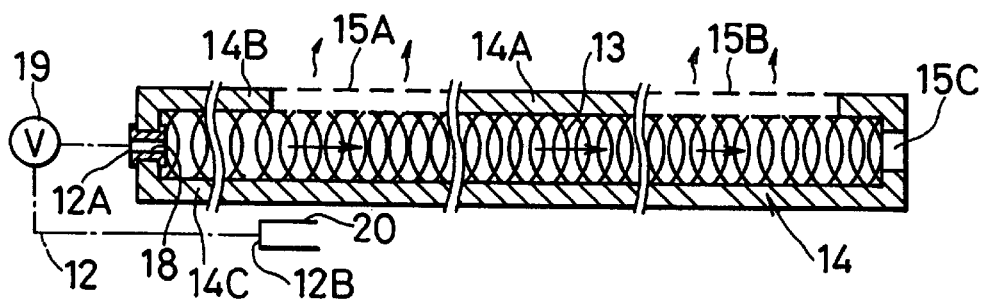
FIG. 4 is a cross section showing the structure of the ventilator shown in FIG. 1.

The air introduced into the air sheet 11 passes into the permeable section 15A through a clearance or pores formed within the cushion member 13 in a region held sandwiched between the non-permeable section 14B and the sheet-like member 14C on the rear surface, as indicated in FIG. 4. In a portion of the permeable section 15A of the air sheet 11 which is located within the areas C1 (see FIG. 2) and which is contacted by the user, an air channel is defined within the cushion member 13 in a region between the contacted area C1 and the sheet-like member 14C on the rear surface. The introduced air contacts part of the body (thigh and buttocks) in the contacted area C1, and then passes through the cushion member 13 in a region located between the non-permeable section 14A and the sheet-like member 14C on the rear surface into the other permeable section 15B where it contacts part of the body (the back) in the contacted areas C2 (see FIG. 2) and is finally displaced externally from the upper and 15C of the air sheet 11 which is not contacted by the user. In this manner, the air which is introduced into the cushion member 13 from the port 18 flows through the interior of the cushion member 13 from a point located forwardly of the seating area through the fold to the back rest, and thence displaced externally from the upper end 15C. If the user moves his body to create a non-contacted area in an upper region of the permeable section 15B which is located adjacent to the back rest, the air partly permeates through such area of the permeable section 15B to be displaced externally. Thus, immediately upon operating the air conditioner 7, part of the body (thigh, buttocks and back) can be cooled or warmed by the introduced air. Thus a comfortable seated condition can be achieved at the same time as the introduction of the air at the given temperature, thus cooling the body by cold air in hot season while warming the body by warm air in cold season. As mentioned above, in the permeable sections 15A, 15B which are contacted by the user, the introduced air at the given temperature flows in direct contact with the body of the user, permitting the body of the user to be cooled or warmed in accordance with the temperature of the introduced air to prevent a sweating of a contacted body portion or a transfer of heat from the seat to the user and thus realizing a comfortable seated condition. In addition, the direct contact of the introduced air at the given temperature with the body of the user eliminates the need for the use of a large differential of the air temperature relative to the bodily temperature, allowing a reduction in the operating cost as compared with a conventional practice in which an air conditioner is adjusted to raise or lower the air temperature within the compartment in order to achieve a desired comfortableness. In particular, during the running of an automobile, the power dissipation of the air conditioner can be suppressed to reduce the fuel cost.

The provision of the air regulating valve 19 in the hose 12 allows the flow rate of the introduced air to be adjusted, enabling the achievement of a comfortableness which depends on the sensation to hotness and coldness of the user. The provision of the non-permeable section 14A having the heat insulating capability along the substantially central area P1 in the air sheet 11 where the latter is folded to extend along the seating area 9A and the back rest 9B of the seat 9 avoids a thermal influence of the introduced air upon the waist of the user. Since the hose 12 is constructed to be able to expand and shrink and since the adapter 20 is applied in conformity to the configuration of the air discharge port 8, the ventilator is applicable to differing types of automobiles.

In the first embodiment described above, the permeable section 15 is provided in a region which is slightly narrower than the areas C1, C2 (see FIGS. 1 and 2) which are contacted when the user sits on the air sheet 11 mounted on the seat 9. However, the invention is not limited thereto, but an alternative arrangement may be chosen such that the permeable section 15 be provided in a region substantially comparable to the contacted areas C1, C2 so that in the event the user moves his body to leave part of the permeable sections 15A, 15B free from contact, the air partly permeates through the permeable section of such part. As a further alternative, the permeable section 15 may be provided over a broader region than the contacted areas C1, C2.

Figure 7:
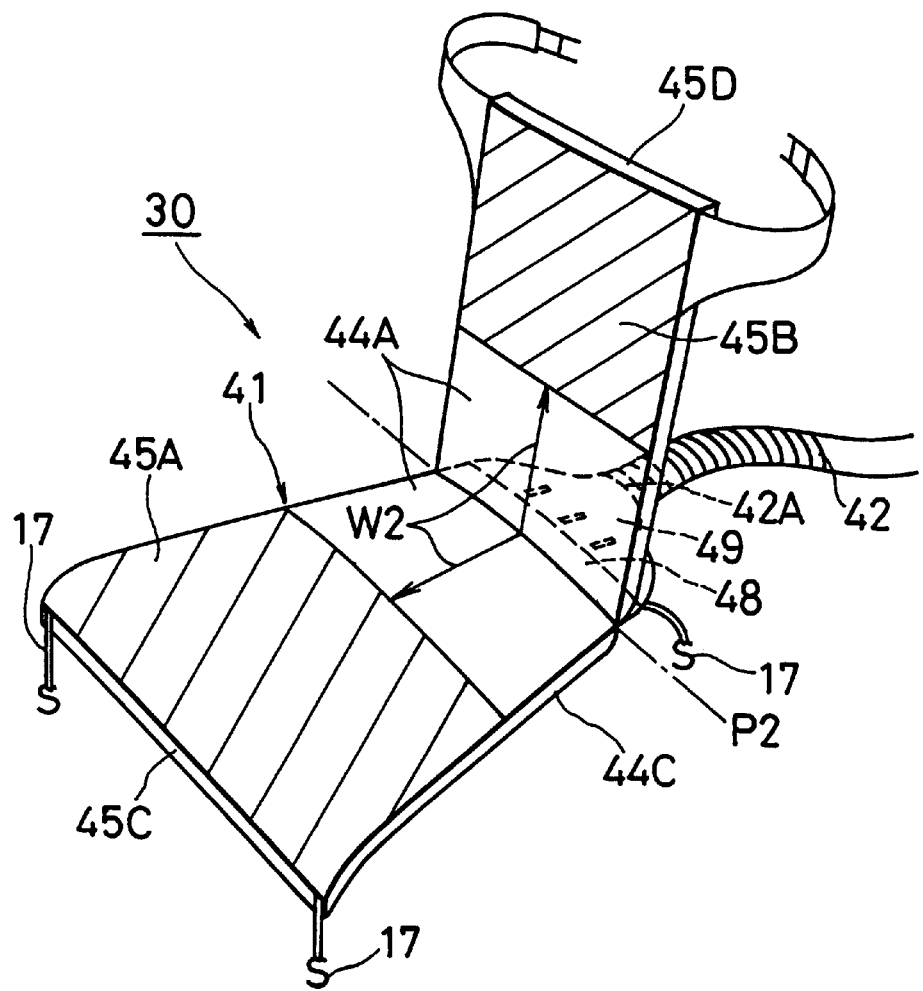
FIG. 7 is an illustration of a ventilator according to a second embodiment of the invention.
Figure 8:
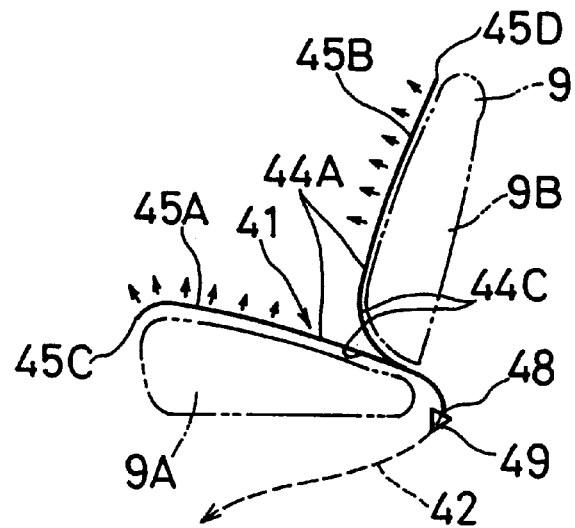
FIG. 8 is an illustration of the ventilator of FIG. 7 mounted on the seat.
Figure 9:
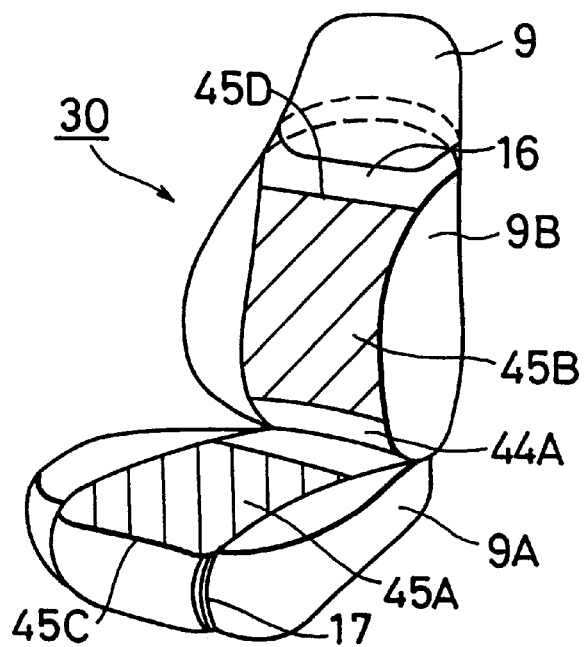
FIG. 9 is another illustration of the ventilator of FIG. 7 mounted on the seat.
Figure 10:
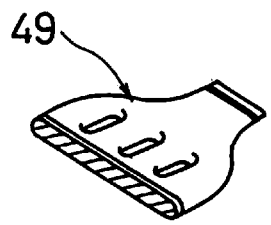
FIG. 10 is a perspective view of a hose connector.
Figure 13:
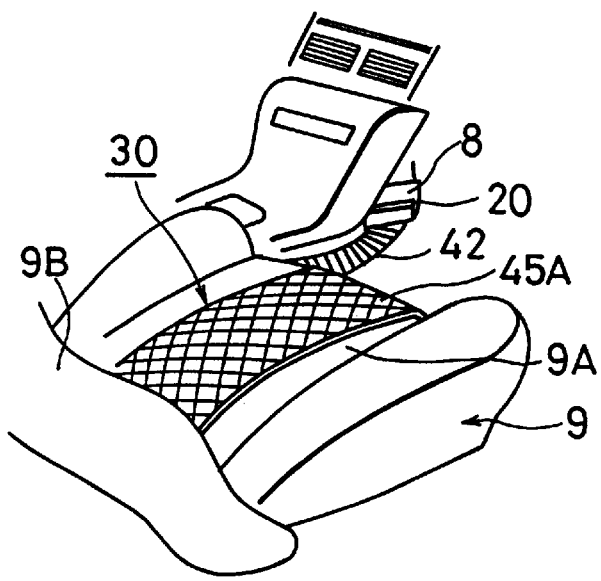
FIG. 13 is an illustration of the ventilator of FIG. 7 mounted on the seat.

Referring to FIGS. 7 to 9, a ventilator 30 for use with vehicle seat according to a second embodiment of the invention will be described. Parts corresponding to those shown in connection with the first embodiment are designated by like reference numerals and characters as used before. It is to be noted that the ventilator 30 is constructed in substantially the same manner as in the first embodiment except for the construction of an air introduction port 48 of an air sheet 41, a permeable section 45A disposed toward a seating area 9A and a connector 49 attached to an outlet end 42A of a hose 42. Referring to FIGS. 7 and 8, a non-permeable section 44A is provided on the front surface of the air sheet 41 with a given length W2 lengthwise along a substantially central area P2 where the air sheet 41 is folded to extend along the seating area 9A and the back rest 9B when mounting it on the seat 9. An air introduction port 48 of the air sheet 41 is formed in an elongate form substantially at the center of a sheet-like member 44C on the rear surface which opposes the non-permeable section 44A. The air sheet 41 includes permeable sections 45A, 45B (see FIGS. 9 and 13) which are juxtaposed with the seating area 9A and the back rest 9B, respectively. At the front end of the seating area 9A and at the top end of the back rest 9B of the air sheet 41, both of which are free from the likelihood of being contacted by the body, clearances 45C, 45D are defined to allow a communication between the cushion member 13 and the exterior. The connector 49 (see FIG. 10) which is attached to the outlet end 42A of the hose 42 is detachably attached to the air introduction port 48 of the air sheet 41 from the rear side of the seat 9. The connector 49 is formed by a blow molding of synthetic resin. The air which is introduced through the hose 42 is branched into two paths extending through the two portions of the air sheet 41 which extend along the seating area 9A and the back rest 9B, respectively, thus assuring the air flow through the air sheet 41 up to the forward end of the seating area 9A and up to the top end of the back rest 9B. As compared with the first embodiment where the air passage extends over a long path from the front end of the seating area to the top end of the back rest, causing a difficulty in achieving an even distribution of the influence of the temperature of the introduced air, an even impingement of the air against the contacting portion of the body is assured in the second embodiment, thus improving the comfortableness.

Figure 11:
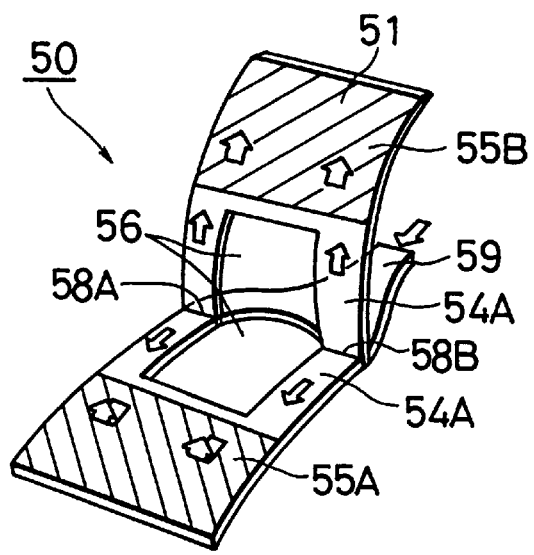
FIG. 11 is an illustration of a ventilator according to a third embodiment of the invention.
Figure 12:
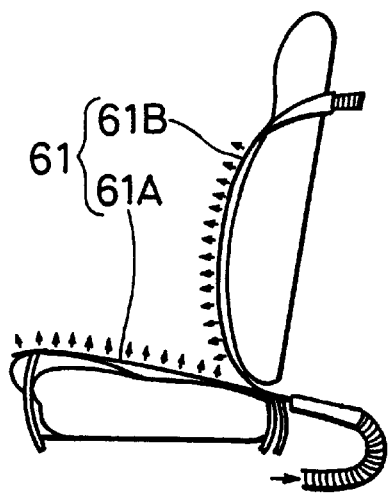
FIG. 12 is an illustration of a ventilator according to a fourth embodiment of the invention.

FIG. 11 shows a ventilator 50 for use with vehicle seat according to a third embodiment of the invention. A cut-out 56 is formed substantially centrally in an air sheet 51. Both front and rear surfaces of the air sheet on the opposite sides of the cut-out 56 are formed to define non-permeable sections 54A, while permeable sections 55A, 55B are formed to overly the seating area 9A and the back rest 9B. On the rear surface, there are provided air introduction ports 58A, 58B for connection with a branched connector 59 of a hose. In this manner, the influence of the air temperature upon the waist is eliminated. In described embodiments, the air sheet 11 (or 41) is formed substantially in conformity to the configurations of the seating area 9A and the back rest 9B of the seat 9. However, it should be understood that the invention is not limited thereto, but may assume other configurations. By way of example, FIG. 12 illustrates a ventilator according to a fourth embodiment of the invention where air sheets 61A, 61B associated with the seating area 9A and the back rest 9B are formed separately from each other, allowing a choice that at least one of the air sheets 61A, 61B can be selectively used.

Figure 14:
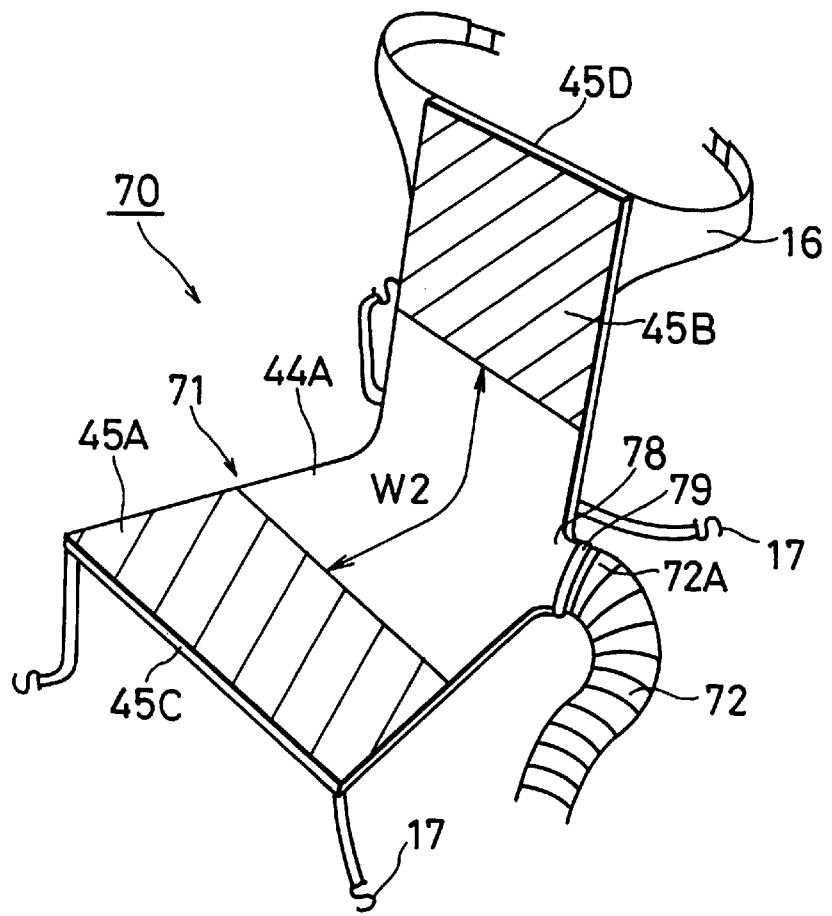
FIG. 14 is an illustration of a ventilator according to a fifth embodiment of the invention.
Figure 15:
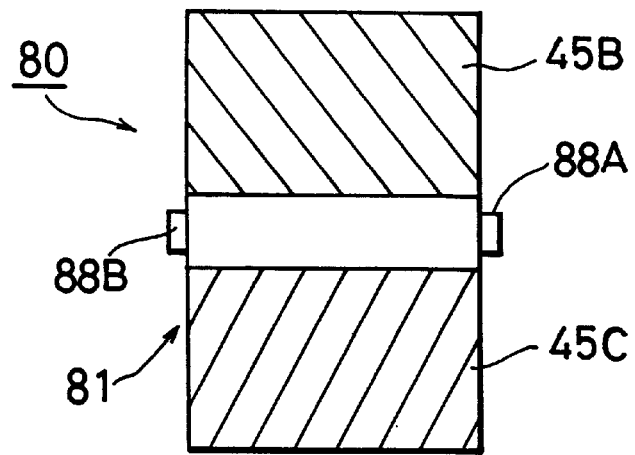
FIG. 15 is an illustration of a ventilator according to a sixth embodiment of the invention.

FIG. 14 shows a ventilator 70 for use with vehicle seat according a fifth embodiment of the invention where an air introduction port 78 is provided on either lateral side of a fold in an air sheet 71 for connection with a hose 72 in contrast to the second embodiment in which the air introduction port 48 connected with the hose 42 is located on the rear side of the fold in the air sheet. FIG. 15 shows a ventilator 80 according to a sixth embodiment of the invention in which air introduction ports 88A, 88B are provided on opposite lateral sides of a fold in an air sheet 81. One of the ports 88A, 88B is connected with a hose, not shown, while the other port is blocked by a plug, not shown. Thus the air sheet 81 can be connected with the hose on either lateral side.

Figure 16:
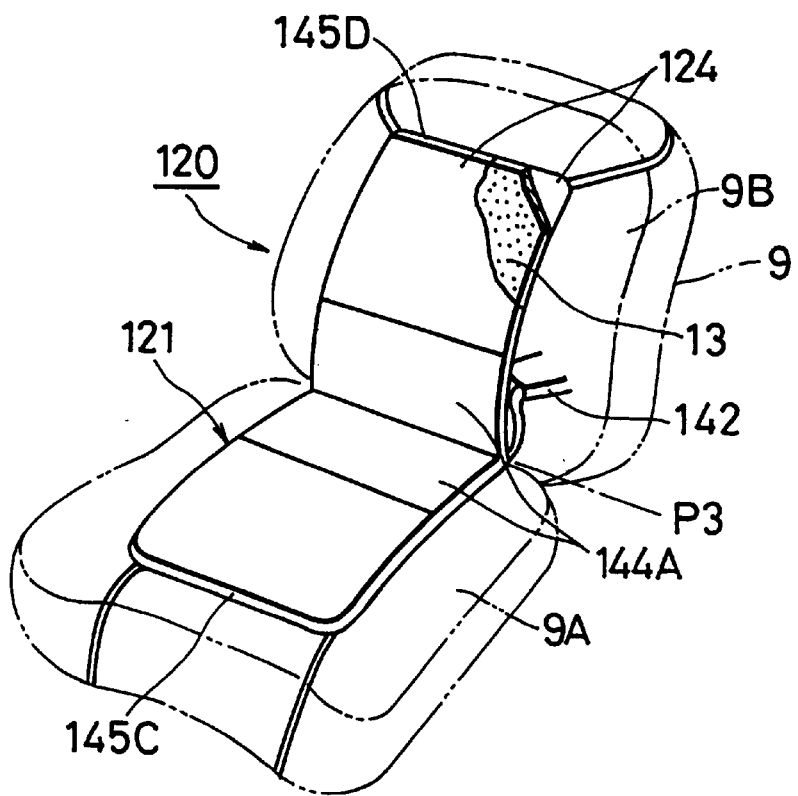
FIG. 16 is a perspective view, partly broken away, of a ventilator according to a seventh embodiment of the invention.

FIG. 16 shows a ventilator 120 for use with vehicle seat according to a seventh embodiment of the invention. The ventilator 120 comprises an air sheet 121 including a permeable cushion member 13 configured into a given configuration which depends on the seat 9, or substantially in conformity to the seating area 9A and the back rest 9B of the seat 9, and having a myriad of pores of therein, and a non-permeable thin sheet-like member 124 which is mounted to cover substantially the entire surface of the cushion member 13, the air sheet being formed with clearances 145C, 145D which permit a communication between the inside of the cushion member 13 and the exterior at the front end of the seating area 9A and at the upper end of the back rest 9B which are free from the likelihood being contacted by the body, and a hose 142 detachably connected to the air seat 121 for introducing an air at a given temperature from the exterior into the cushion member 13. A heat insulator 144A having a given length lengthwise is provided on the front surface of the air sheet 121 along a substantially central location P3 corresponding to a fold between the seating area 9A and the seat back 9B. When a user sits on the seat 9 on which the air sheet 121 is mounted and an air at a given temperature from the hose 142 is introduced into the air sheet 121, the air channel is defined within the cushion member 13 which is surrounded by the sheet-like member 124, externally displacing the air which worked through the clearances 145C, 145D. Accordingly, the introduced air flows in contact with the rear surface of the sheet-like member 124 which is contacted by the user. Since the introduced air does not contact the user directly, the temperature of the introduced air is transmitted to the user after being tempered. Accordingly, if a strongly cold or warm air is introduced, the likelihood that the body is exposed to an excessive temperature which causes an excessive cooling or warming is avoided, providing a comfortable seated condition.

Figure 17:
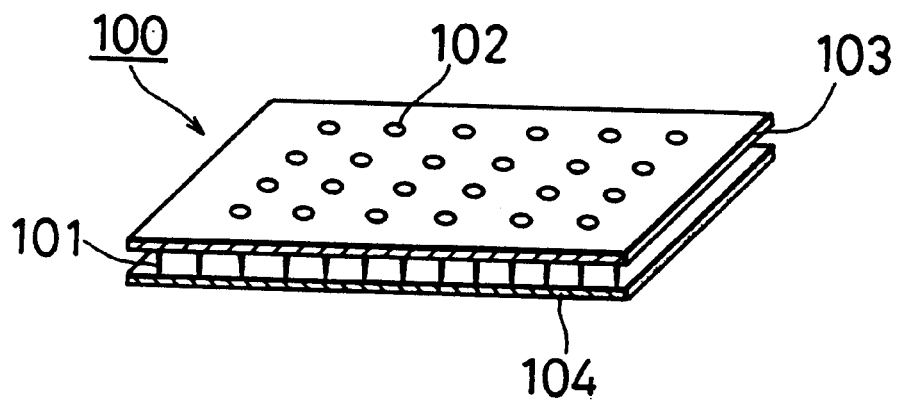
FIG. 17 is a perspective view, partly broken away, of a modification of the air sheet.
Figure 18:
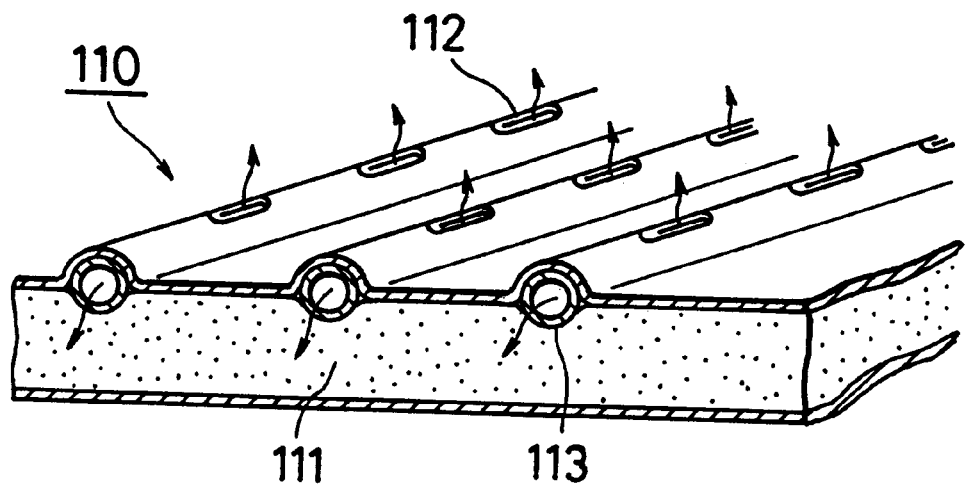
FIG. 18 is a perspective view, partly broken away, of another modification of the air sheet.

In the embodiments mentioned above, the air channel member, the non-permeable member and the permeable section of the air sheet are illustrated as being formed by the cushion member, the sheet-like member and the meshy cloth member, respectively, but it should be understood that the invention is not limited thereto. By way of example, an air sheet may comprise a front section 103 of rubber or plastic having a multiplicity of projections 101 on its bottom surface and having a multiplicity of ventilating holes 102 perforated therein, and a non-permeable member 104 which is attached to the underside of the front section 103, thus allowing the layer defined by the projections 101 to serve as a ventilating layer, as illustrated in FIG. 17. This air sheet is hardly foldable, and hence it is preferable that the air sheets for the seating area and the back rest be formed separately. In addition, the projections 101 may be replaced by springs interposed between the front section 103 and the non-permeable member 104 to define the air channel member. Additionally, the air channel member may comprise a foam member having its interior excavated or a string of soft plastic woven or knit into a complicated entangled structure in the form of a bird's nest. In this manner, it is only required that the air channel member has a given thickness and defines an air layer. Moreover, an air sheet may be formed by juxtaposing a multiplicity of vinyl tubes 113 of a small diameter on a cushion member 111 to provide an air passage through the vinyl tubes 113, with the vinyl tubes 113 being formed with a number of vents 112, as shown in FIG. 18.

In the embodiments mentioned above, an air sheet has been described which is used with a single seat. However, it should be understood that the invention is not limited thereto, but the air sheet can be formed so as to be able to be mounted on a plurality of juxtaposed seats. In addition, while each air sheet is connected to a hose in each of the embodiments described above, the hose may be branched for connection with a plurality of air sheets. In the described embodiments, the air sheet 11 is mounted on the seat 9 by using mounting belts 16 and S-shaped fixtures 17, but the invention is not limited to the use of them, and instead, cloth tapes having a number of hooks and piles formed thereon may be applied to the rear surface of the air sheet 11 and the given location on the surface of the seat 9 to mount the air sheet 11 in a detachable manner, thus preventing a displacement from each other during use. Alternatively, a number of roundabout routes which increase the length of the air channel within the cushion member until the air discharge port is reached may be formed, increasing the length of time until the introduced air is discharged externally, thus enhancing the effect of the invention. The connector 49 used in described embodiments are formed by blow molding from synthetic leather, but the method of manufacturing it is not limited to the blow molding. Additionally the provision of the air regulating valve 19 in the hose 12 can be dispensed with when an adjustment of the air flow from the air conditioner 7 is utilized.

With the ventilator according to the first embodiment of the invention, the body of the user can be cooled or warmed immediately upon the introduction of an air at a given temperature from the exterior into the air sheet, and thus a comfortable seated condition can be achieved at the same time as the introduction of the air. Since the ventilator can be manufactured in a simple construction, manufacturing cost can be reduced. Because the air sheet is separately mounted on each seat, a comfortable seated condition can be obtained for each user without being influenced by the air temperature within the compartment or by the location of the seat. Since an arrangement is made so that the introduced air comes into the direct contact with part of the body of the user, it is only necessary that that the temperature of the introduced air be adjusted in accordance with a temperature difference relative to the body temperature, thus allowing the air consumption, and hence the operating cost of the air conditioner to be supressed, as compared with a conventional practice in which the air temperature within the compartment is adjusted by the air conditioner. Since the air sheet is removable from the seat, maintenance is facilitated.

With the ventilator according to the seventh embodiment of the invention, when an air at a given temperature is introduced into the air sheet from the exterior, the body of the user is cooled or warmed through the interposed non-permeable member, and accordingly, if a strongly cold or warm air is introduced into the air sheet, the air temperature is not directly brought into contact with the body of the user while achieving a comfortable seated condition.

Figure 19:
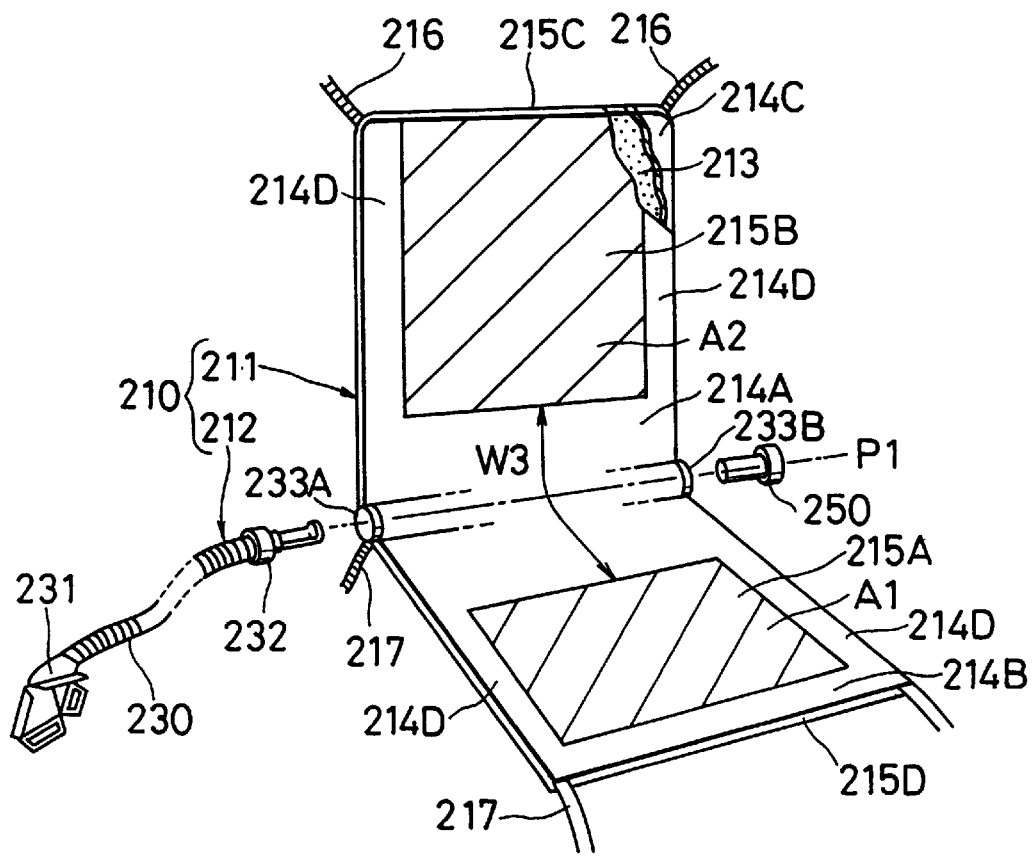
FIG. 19 is a perspective view of a ventilator according to an eighth embodiment of the invention.
Figure 24:
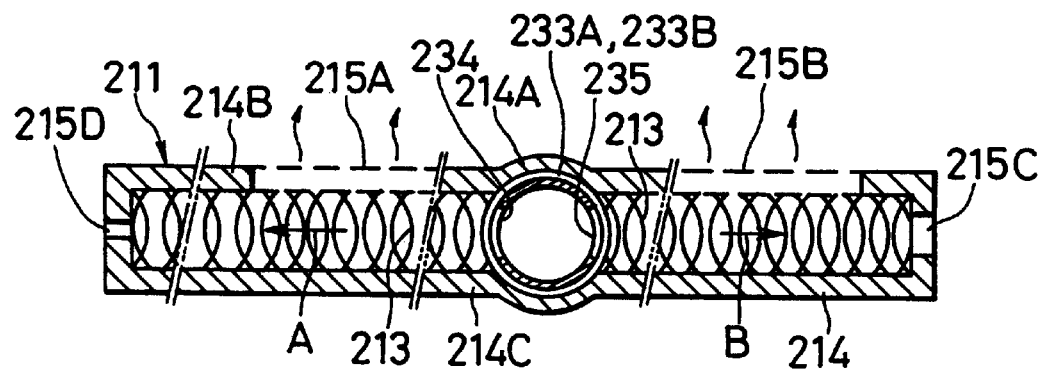
FIG. 24 is a schematic illustration of the air sheet structure of the ventilator shown in FIG. 19.

A ventilator 210 for use with vehicle seat according to an eighth embodiment of the invention will now be described. Referring to FIG. 19, the ventilator 210 is configured into the configuration of a seat 209 (see FIG. 20) of an automobile equipped with an air conditioner 246 (FIG. 24), or in conformity to a seating area 209A and a back rest 209B of the seat 209. Referring to FIG. 24, the ventilator 210 comprises an air sheet 211 including a permeable cushion member (air channel member) 213 having a myriad of air permeable pores formed therein, and a sheet-like member (non-permeable member) 214 mounted to cover substantially the entire surface of the cushion member 213 and having permeable sections 215A, 215B formed on its front surface which provide a communication between the cushion member 213 and the exterior, and an introduction hose assembly (introduction passage) 212 detachably connected to the air sheet 211 for introducing an air at a given temperature from the exterior into the cushion member 213. The sheet-like member 214 is formed of non-permeable material such as vinyl chloride, leather or the like, and is attached to cover the rear side of the cushion member 213.

The cushion member 213 is a resilient, foldable and flexible cushion member having a given thickness, and is formed by weaving a plastic mono-filament yarn in the manner of a pile yarn on a double pile loom into a honeycomb structure. The entire rear surface of the air sheet 211 represents a non-permeable section 214C which is covered by the sheet-like member 214 while the front surface of the air sheet 211 comprises non-permeable sections 214A, 214B which are covered by the sheet-like member 214, and permeable sections 215A, 215B which are formed by a permeable textile fabric or a meshy cloth. The permeable sections 215A, 215B are formed at given locations A1,A2 (shown hatched in FIG. 20) on the surface of the cushion member 213, and provide a communication between the cushion member 213 and the exterior. The permeable sections 215A, 215B are formed in areas contacted by the buttocks and the back, respectively, of the user when the user sits on the air sheet 211 which is mounted on the seat 209. In the present embodiment, the permeable sections 215A, 215B are formed in areas which are slightly less than the contacted areas.

Figure 20:
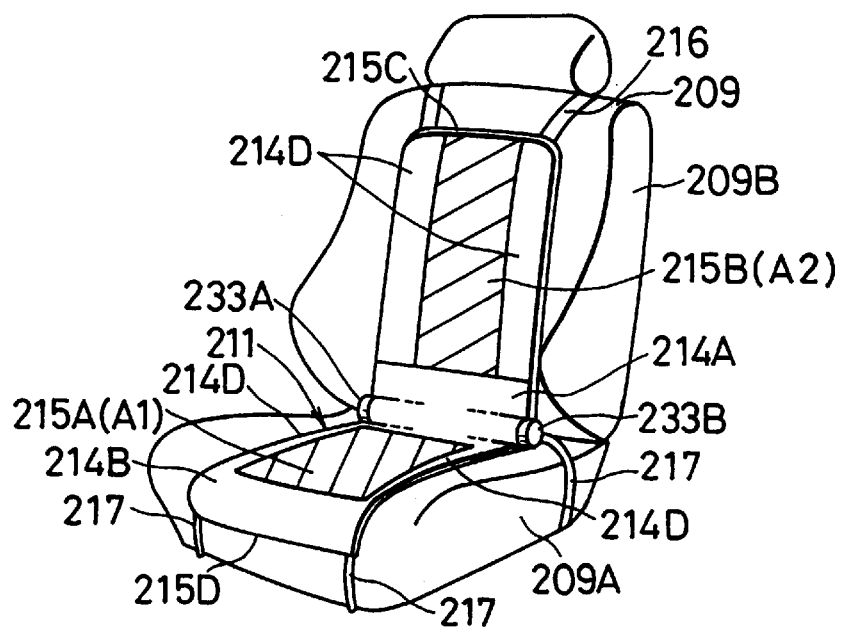
FIG. 20 is a perspective view of the air sheet of the ventilator shown in FIG. 19 mounted on the seat.

As shown in FIGS. 19 and 20, non-permeable sections 214A, 214B, 214D are formed at given locations on the surface of the air sheet 211. The non-permeable section 214A has a given length W3 lengthwise along a substantially central location P1 corresponding to a fold between the seating area 209A and the back rest 209B (see FIG. 20). A sheet-like member 214 having heat insulating capability is used for the non-permeable section 214A. In this manner, the influence of the introduced air upon the waste of the user is avoided when the air sheet 211 is mounted on the seat 209. The non-permeable section 214B is disposed fowardly of the permeable section 215A. The remaining permeable section 214D is formed to a given width along the opposite sides of the front surface of the air sheet 211. Air discharge ports 215C, 215D are also provided. It will be noted that mounting belts 216 and S-shaped fixtures 217 are used along the outer edge of the air sheet 211 to mount it on the seat 209.

The introduction hose assembly 212 comprises a hose 230 which is molded into the configuration of bellows from a synthetic resin material, and thus is both flexible and extensible/shrinkable, an adapter 231 attached to the inlet end of the hose 230 and covering an external air discharge port, and a connector 232 attached to the outlet end of the hose 230. The air sheet 211 is provided with connector receivers 233A, 233B disposed at air introduction ports located on the opposite lateral sides of the location P1 corresponding to the fold between the seating area and the back rest and into which the connector 232 is inserted. The connector receivers 233A, 233B are disposed on opposite sides in order to allow them to be utilized from either driver's seat and/or assistant's seat, and also permit the air sheet 211 to be reversed.

Figure 21:
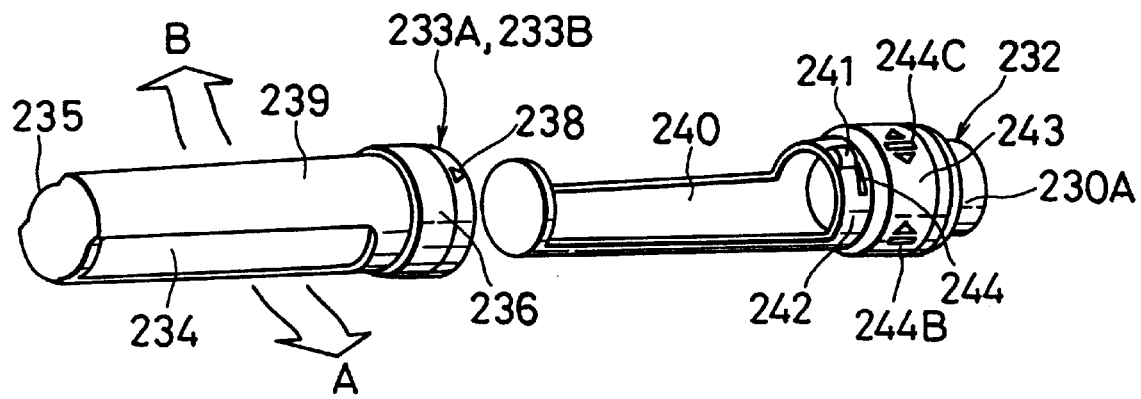
FIG. 21 is an illustration of a connector and a connector receiver in the ventilator shown in FIG. 19.
Figure 23:
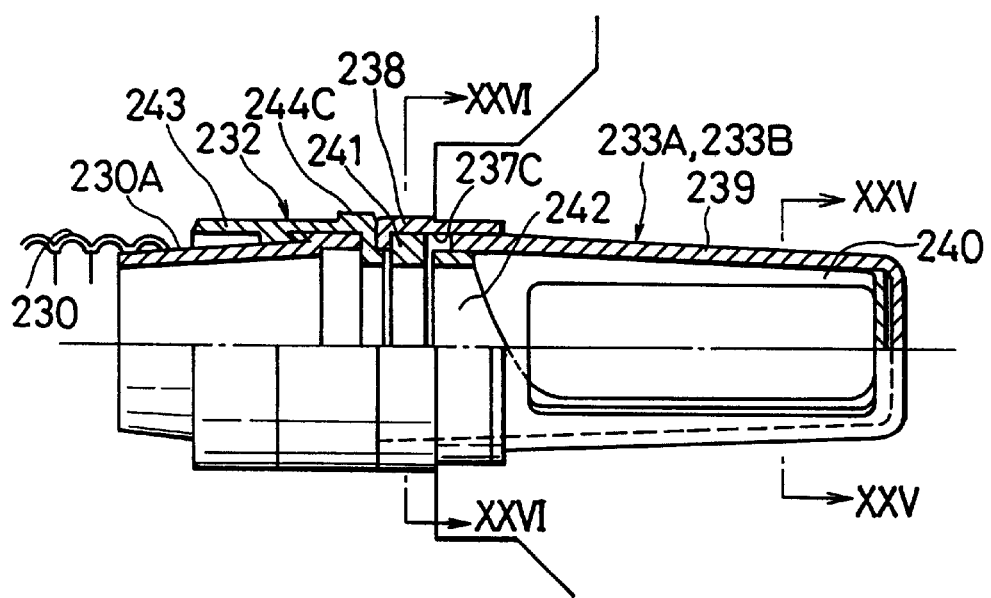
FIG. 23 is a longitudinal section of the connector and the connector receiver of the ventilator shown in FIG. 19 when connected together.
Figure 26:
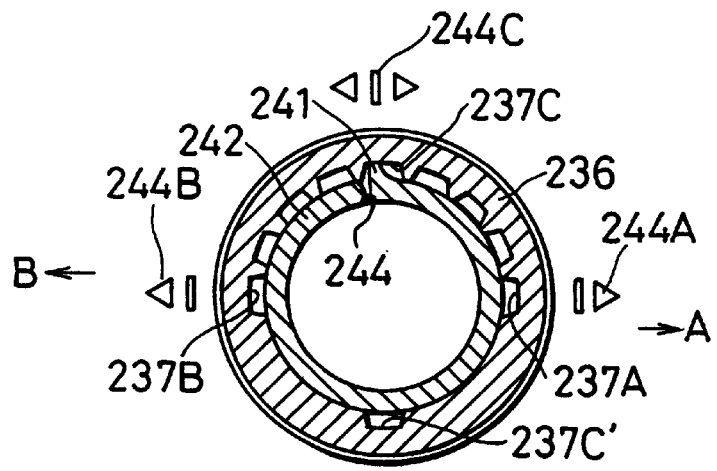
FIG. 26 is a longitudinal section taken along the line XXVI—XXVI shown in FIG. 23.

Referring to FIGS. 21, 23 and 24, each of the connector receivers 233A, 233B comprises a sleeve of a reduced diameter 239 having elongate slots 234, 235 formed therein so as to be circumferentially located opposite to each other and which open into the cushion member 213 located toward the seating area of the air sheet 211 (or in a direction A indicated in FIGS. 21 and 24) and into the cushion member 213 located toward the back rest (or in a direction B indicated in FIGS. 21 and 24), and a sleeve of an increased diameter 236 continuing from the outer periphery of the sleeve 239 and having engaging grooves 237 (237A, 237B, 237C, 237C') formed at given locations around its inner periphery (see FIG. 26). As shown in FIG. 21, on the opening side of each connector receiver 233A, 233B, an indicator 238 which indicates a rotational position of the connector 232 relative to the connector receivers 232A, 233B is provided.

Referring to FIGS. 21, 23 and 24, the connector 232 comprises a split sleeve 240 which is inserted into the sleeve 239 of a reduced diameter and slides therein in a rotatable manner, a sleeve 242 formed in a manner corresponding to the sleeve 236 of an increased diameter and having a detent pawl 241 which is resiliently detented in one of engaging grooves 237, and a portion of a lager diameter 243 which is formed toward the hose 230 than the sleeve 242 and which is brought into abutment against the indicator 238 of the connector receiver 233A, 233B. The portion of a lager diameter 243 is connected to a connection sleeve 230A which is mounted on the hose 230 in a rotatable manner.

Figure 27:
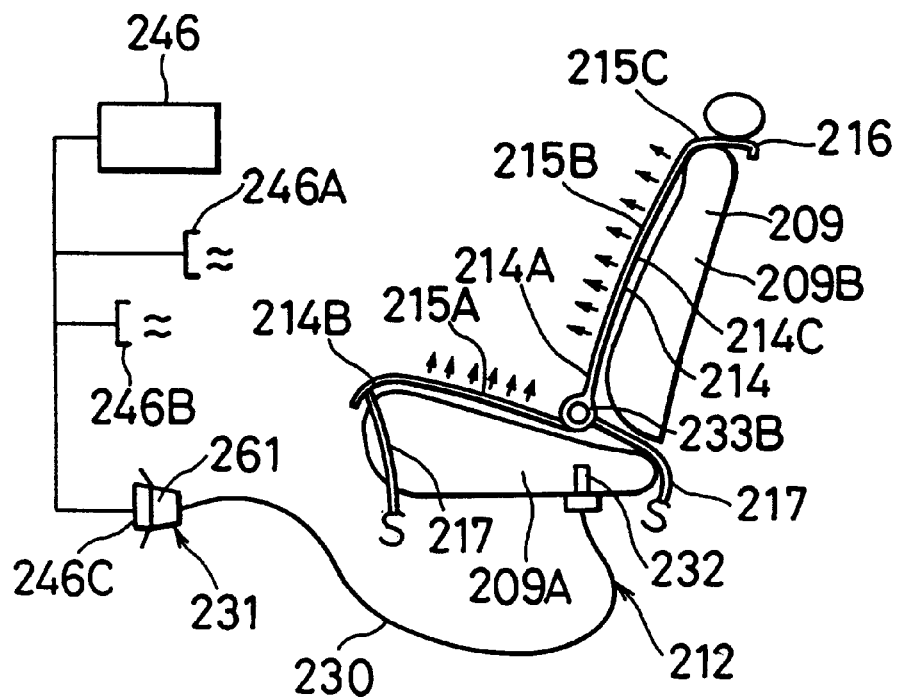
FIG. 27 is an illustration of ventilator shown in FIG. 19 which is connected to an air conditioner through an air introduction hose.

When the connector 232 is inserted into either connector receiver 233A or 233B and then rotated, depending on the rotational position, the split sleeve 240 blocks either one of the elongate slots 234, 235 or open the both slots 234, 235 for selectively guiding the air at the given temperature which is introduced from an air conditioner 246 (see FIG. 27) through the introduction hose assembly 212 into portions of the cushion member 213 of the air sheet 211 which are disposed adjacent to the seating area and the back rest.

Figure 25:
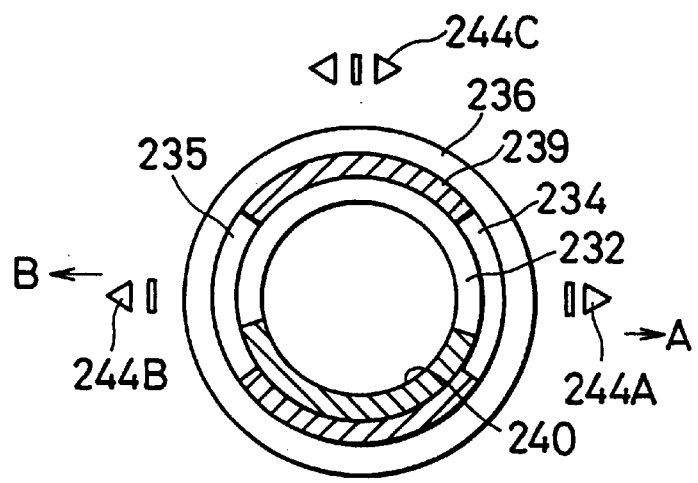
FIG. 25 is a longitudinal section taken along the line XXV—XXV shown in FIG. 23.

Referring to FIG. 21, the sleeve 242 is formed with an L-shaped cut groove 244 around the detent pawl 241, causing the detent pawl 241 to be displaced resiliently in a radial direction. When the connector 232 is inserted into either connector receiver 233A, 233B and rotated therein, the detent pawl 241 fits in one of the engaging grooves 237 formed around the inner periphery of the sleeve 236 of the corresponding connector receiver 233A or 233B, thus blocking the rotation of the connector 232 and also serving as an anti-withdrawal element. Referring to FIGS. 21, 25 and 26, the larger diameter portion 243 of the connector 232 is provided with indicators 244A, 244B, 244C which indicate a corresponding circumferential position of the connector 232. (The indicator 244A indicates the introduction of the air into the portion of the air sheet 211 disposed adjacent to the seating area; the indicator 244B indicates the introduction of the air into the air sheet portion disposed adjacent to the back rest; the indicator 244C indicates the introduction of the air into the both portions of the air sheet 211.) When the connector 232 is inserted into the connector receiver 233A or 233B and turned to bring a desired one of the indicators 244A, 244B, 244C into alignment with the indicator 238, the split sleeve 240 opens or blocks a given one or ones of the elongate slots 234, 235 depending on the rotational position while the detent pawl 241 fits into one of the detent grooves 237A, 237B, 237C which correspond to the indicators 244A, 244B, 244C respectively, formed in the connector receivers 233A, 233B thus blocking a further rotation of the connector 232 and also preventing the connector 232 from being withdrawn from the connector receivers 233A, 233B.

Figure 22:
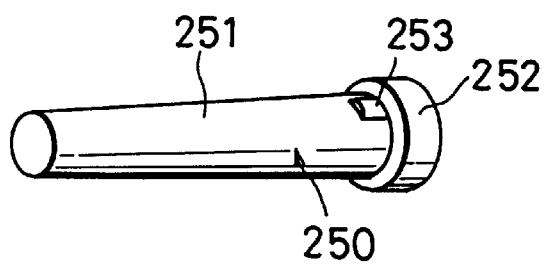
FIG. 22 is a perspective view of a plug member of the ventilator shown in FIG. 19.

Referring to FIG. 22, a cylindrical plug member 250 is inserted into one of the connector receivers 233A, 233B to interrupt the communication between the inside and the outside of the air sheet 211. The plug member 250 comprises a sleeve 251 of a reduced diameter which is inserted into the connector receiver 233A, 233B to block the elongate slots 234, 235 and which is provided with a projection 253 which can be fitted into one of the engaging grooves 237, and a sleeve 252 of an increased diameter which is formed radially outward of the sleeve 251 and which is brought into abutment against the indicator 238. When the connector 232 of the introduction hose assembly 212 is connected to one of the connector receivers 233A, 233B of the air seat 211, the plug member 250 is mounted in the other of the connector receivers 233A, 233B to prevent the air which is introduced into the air sheet 211 from leaking from the air sheet and to achieve a balanced guidance of the introduced air in the desired flow direction.

Figure 28:
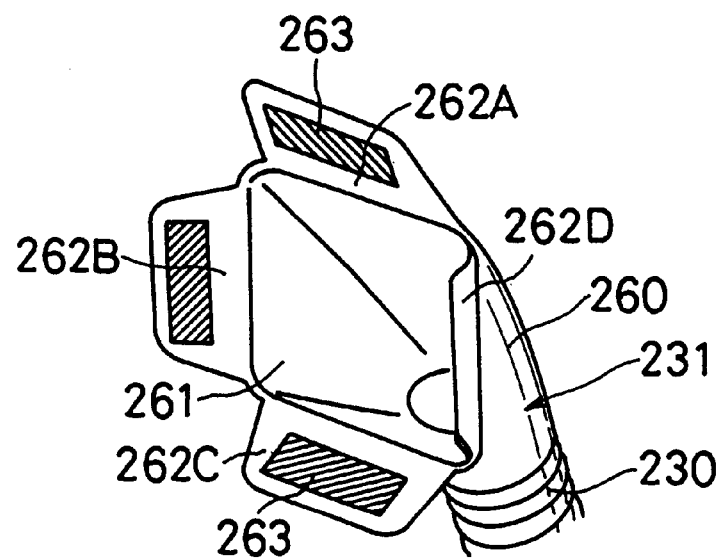
FIG. 28 is a perspective view of an adapter of the ventilator shown in FIG. 19.

Referring to FIG. 28, the adapter 231 comprises a base 260 which is connected to the hose 230 and having an enlarging air inlet port 261, and a plurality of applied pieces 262A, 262B, 262C, 262D which are formed to be rockable along the air inlet port 261 and applied around one of air discharge ports 246A, 246B, 246C of the air conditioner 246 (see FIG. 27), thus covering the corresponding one of the air discharging ports 246A, 246B, 246C. An adhesive layer 263 is applied on the inside of each of applied pieces 262A, 262B, 262C, 262D so as to surround the periphery of one of the air discharging ports 246A, 246B, 246C in accordance with the configuration and size of such one of the air discharging ports 246A, 246B, 260C thus receiving the air from the air conditioner 246. The applied pieces 262A, 262B, 262C, 262D are designed to guide the air delivered from the air conditioner 266 into the introduction hose assembly 212 efficiently if they do not completely cover one of the air discharging ports 246A, 246B, 246C, that is, if there is a slight clearance.

The operation of the ventilator according to the eighth embodiment will now be described. Initially, the air sheet 211 is mounted on the seat 209 disposed within an automobile which is equipped with the air conditioner 246, using the mounting belts 216 and S-shaped fixtures 217. Then, the connector 232 of the introduction hose assembly 212 is connected to one of the connector receivers 233A, 233B of the air sheet 211 while the plug member 250 is mounted in the other of the connector receivers 233A, 233B. The applied pieces 262A, 262B, 262C, 262D of the adapter 231 are applied around one of the air discharging ports 246A, 246B, 246C of the air conditioner 246, thus covering such discharging port. At this end, the adapter 231 of the introduction hose assembly 212 is designed to accommodate for a variety of the air discharging ports which may be used as the air discharging ports 246A, 246B, 246C.

When a user sits on the seat 209 on which the air sheet 211 is mounted and the engine is started to operate the air conditioner 246, an air at a given temperature (cold air or warm air) from one of the air discharging ports 246A, 246B, 246C is introduced into the air sheet 211 through the introduction hose assembly 212. At this time, the user turns the large diameter portion 243 of the connector 232 to align a desired one of indicators 244A, 244B, 244C with the indicator 238 on the connector receivers 233A, 233B. For example, the indicator 244A may be aligned with the indicator 238, whereupon the split sleeve 240 opens the elongate slot 234 while closing the elongate slot 235, and the detent pawl 241 fits in the engaging groove 237A to cause the connector 232 to be locked to one of the connector receivers 233A, 233B. Accordingly, the air which is introduced into the air sheet 211 through the introduction hose assembly 212 passes through the interior of the cushion member 213 which is disposed toward the seating area of the air sheet 211 (refer arrow A shown in FIG. 24), and the air which permeates into the permeable section 215A contacts part of the body (thigh and buttocks) while the air which worked is displaced through the discharging port 215D.

Similarly, when the indicator 244B is aligned with the indicator 238, the split sleeve 240 opens the elongate slot 235 while closing the elongate slot 234, and the detent pawl 241 fits in the engaging groove 237B. Accordingly, the air which is introduced into the air sheet 211 passes through the interior of the cushion member 213 disposed toward the back rest of the air sheet 211 (see arrow B shown in FIG. 24) while the air which worked is displaced through the discharging port 215C. Alternatively, when the indicator 244C is aligned with the indicator 238, the split sleeve 240 opens the both elongate slots 234, 235, and the air which is introduced into the air sheet 211 passes into the both portions of the air sheet 211 which are disposed toward the back rest and the seating area. In this manner, the direction of the flow of the air which passes through the air sheet can be controlled in accordance with the desired rotational position of the connector 232.

When the connector 232 is turned to prevent the detent pawl 241 from being engaged with the engaging groove 237B and the indicator 238 is positioned intermediate the indicators 244A, 244B, 244C, an area of opening of the elongate slots 234, 235 can be adjusted, thus controlling the flow rate of the air which is introduced into the air sheet 211. In addition, the front side and the rear side of the air sheet 211 can be selectively used depending on the body temperature. In this manner, the ventilator of the present embodiment can accommodate for a variety of the air discharging ports of air conditioners of differing types. An adjustment of the flow rate into the air sheet can be made with a simple construction, and the direction of the flow of the air which is introduced into the air sheet can be changed freely.

While the engaging grooves in the connector receivers are formed at four locations at an equal interval circumferentially in the described embodiment, the invention is not limited thereto, but a multiplicity of engaging grooves may be formed circumferentially to define the circumferential position of the split sleeve 240 finely, thus allowing the area of opening provided by the elongates slots 234, 235 to be fixed depending on the rotational position chosen to control the flow rate of the air which is introduced into the air sheet. While the permeable sections 215A, 215B are disposed on the front side of the permeable cushion member 213 in the described embodiment, the invention is not limited thereto, and instead, a non-permeable thin sheet may be used to cover the entire front surface of the cushion member 213, in a manner illustrated by the seventh embodiment, thus preventing a direct contact of the air with the body while allowing the air temperature to be transferred to the body through the air sheet. In such instance, a highly heat insulating non-permeable member may be provided around the waste. The air sheet can be reversed for use. In the described embodiment, the connector 232 is fitted into the connector receiver 233A or 233B and is then turned to control the flow rate of the air in accordance with the rotational position, but the flow rate and the direction of flow of the air which is introduced can be adjusted by axial displacement of the connector and the connector receiver relative to each other.

With the ventilator according to the eighth embodiment, the flow rate into the air sheet can be controlled with a simple construction, and the direction of flow of the air into the air sheet can be changed freely, thus improving the comfortability. The ventilator employs an adapter which can accommodate for a variety of air discharging ports of air conditioners of differing types, thus enhancing the universal application of the introduction hose assembly and also permitting the reduction in the manufacturing cost.

What is claimed is:

1. A ventilator for use with a vehicle seat comprising: an air sheet mounted on said seat and including an air introduction port, an air channel member having a clearance formed therein through which air can flow, and a non-permeable member mounted to cover substantially the entire surface of the air channel member and having a permeable section formed on its front surface which provides communication between the air channel member and an exterior; and an introduction passage detachably connected with the air sheet for introducing air into the air channel member, the introduction passage including a flexible hose, an adapter mounted on an inlet end of the hose and connected to an external air discharging port, and a connector mounted on an outlet end of the hose and connected to the introduction port formed in the air sheet, the air introduction port of the air sheet having a connector receiver in which the connector is fitted, the connector and the connector receiver being displaceable relative to each other to control the air which is introduced into the air sheet when the connector is connected with the connector receiver.

2. The ventilator according to the claim 1 in which a permeable section and a non-permeable section are formed at given locations on the front surface of the air sheet.

3. The ventilator according to claim 2 in which the permeable section on the air sheet is formed substantially in conformity to an area which is contacted when a user sits on the air sheet mounted on a seat.

4. The ventilator according to claim 3 in which the air sheet includes substantially rectangular surfaces which can be mounted on a seating area and a back rest of the seat, a non-permeable section having a given length being lengthwise disposed on the front surface of the air sheet at a location corresponding to a fold between the seating area and the back rest as the air sheet is mounted on the seat.

5. The ventilator according to claim 4 in which an air introduction port is formed in the air sheet forwardly of the seating area for connection with an outlet end of the introduction passage, and a non-permeable section is formed on the front surface of the air sheet adjacent to the connection between the air introduction port and the outlet end.

6. The ventilator according to claim 4 in which an air introduction port is formed in the rear surface of the air sheet at a location corresponding a fold between the seating area and the back rest for connection with an outlet end of the introduction passage.

7. The ventilator according to claim 4 in which a cut-out is formed substantially centrally in the air sheet, non-permeable sections being formed on the front and the rear surface of the air sheet on the opposite sides of the cut-out, air introduction ports being disposed on the rear surface on the opposite sides of the cut-out for connection with outlet ends which are branched from the introduction passage.

8. The ventilator according to claim 1 in which the air channel member is formed as a flexible cushion member having a given thickness, the non-permeable member is formed as a sheet-like member, and the permeable section of the air sheet is formed by a meshy cloth.

9. The ventilator according to claim 1 in which the connector is disposed to be rotatable relative to the hose and the connector receiver, the air which is introduced into the air sheet being controlled in accordance with a rotational position of the connector when it is connected with the connector receiver.

10. The ventilator according to claim 1 in which the connector receiver is disposed on the opposite sides of the air sheet along the fold between the seating area and the back rest, the connector of the introduction passage being connected to one of the connector receivers while a plug member capable of interrupting a communication between the exterior and the interior of the air sheet being detachably mounted in the other connector receiver.

11. The ventilator according to claim 9 in which the connector is locked at a given rotational position when it is connected with the connector receiver.

12. The ventilator according to claim 9 in which the flow rate of the air into the air sheet from the exterior is controllable in accordance with a rotational position of the connector when the connector is connected with the connector receiver.

13. The ventilator according to claim 9 in which the direction of flow of the air which is introduced into the air sheet can be changed in accordance with a rotational position of the connector when the connector is connected with the connector receiver.

14. The ventilator according to claim 9 in which the connector receiver comprises a tubular member including a sleeve of a reduced diameter having openings formed therein which open into the air channel member disposed toward the seating area and the air channel member disposed toward the back rest, and a sleeve of an increased diameter continuing from the outer periphery of the sleeve of a reduced diameter and having a plurality of engaging portions formed at given locations circumferentially, and in which the connector comprises a split sleeve which is fitted into the sleeve of a reduced diameter for rotation therein, a tubular portion formed to be received in the sleeve of an increased diameter and having a detent which is resiliently engaged by the engaging portion, and a larger diameter portion formed on the hose side of the tubular portion and disposed for abutment against the sleeve of the increased diameter of the connector receiver, the arrangement being such that when the connector is connected with the connector receiver, the connector is locked at a given circumferential position relative to the connector receiver while simultaneously preventing a withdrawal of the connector from the connector receiver.

15. The ventilator according to claim 14 in which the larger diameter portion of the connector is provided with an indicator which indicates a given circumferential position of the connector while toward the opening, the connector receiver is formed with a reference indicator which indicates a rotational position of the connector relative to the connector receiver.

16. The ventilator according to claim 1 in which the adapter comprises a base having an air inlet port having one end connected to the hose and the other end which enlarges toward the outside, and a plurality of applied pieces formed along the air inlet port to be applied around an external air discharging port so as to cover it.

* * * * *